Nov. 3, 1970  E. E. HOCKADAY  3,538,237
UNIVERSAL GUY ATTACHMENT DEVICE
Filed Feb. 4, 1969
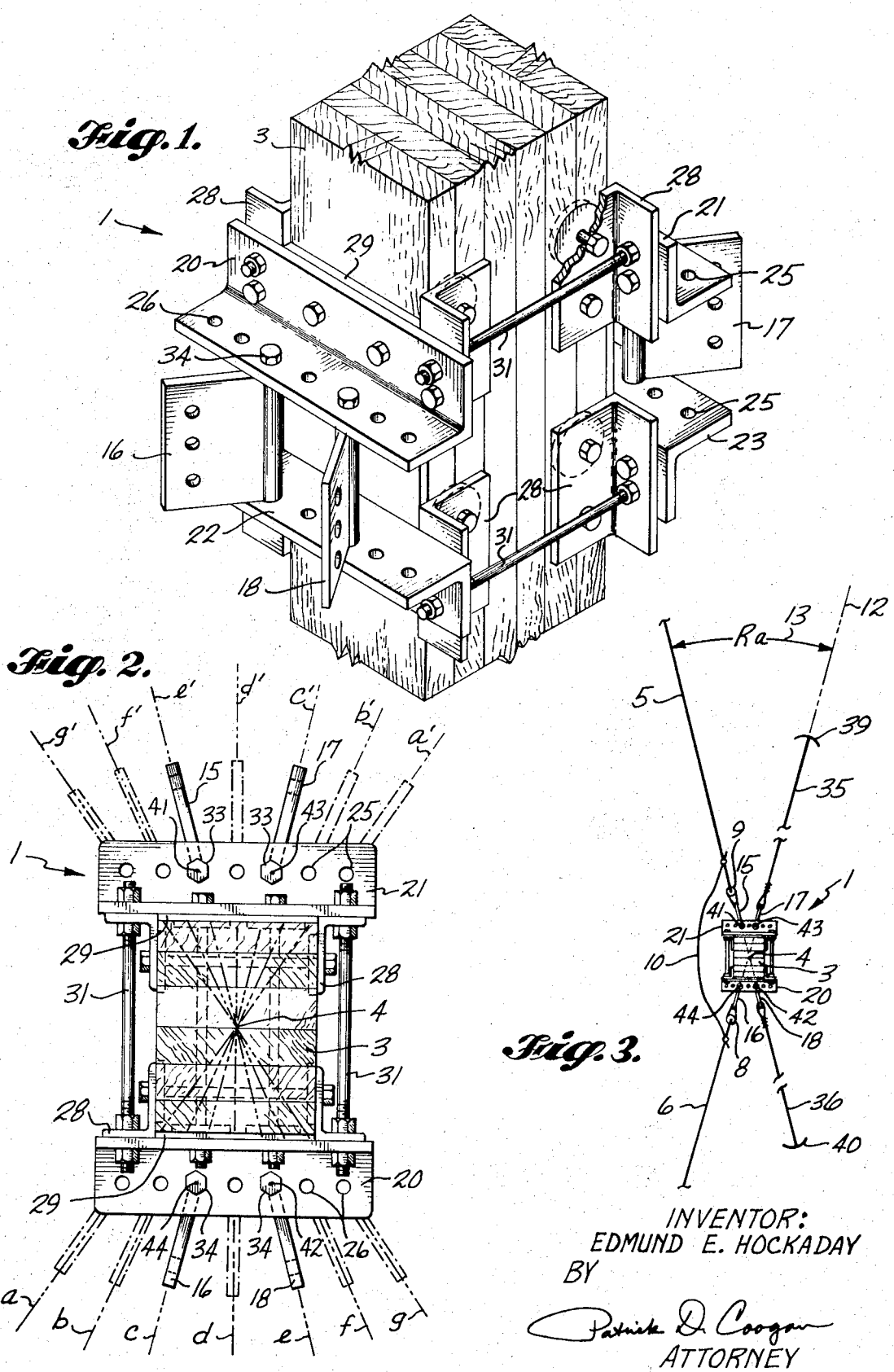
INVENTOR:
EDMUND E. HOCKADAY
BY
Patrick D. Coogan
ATTORNEY

United States Patent Office 3,538,237
Patented Nov. 3, 1970

---

3,538,237
UNIVERSAL GUY ATTACHMENT DEVICE
Edmund E. Hockaway, St. Paul, Minn., assignor to Weyerhaeuser Company, Tacoma, Wash., a corporation of Washington
Filed Feb. 4, 1969, Ser. No. 796,414
Int. Cl. H02g 7/20
U.S. Cl. 174—43        6 Claims

ABSTRACT OF THE DISCLOSURE

Disclosed is a universal hardware device which is secured to the upper end of rectangular cross-sectioned electric utility poles. The dead ends of the electric energy transmission cable and the guy wires are attached to connector members forming part of the device. Each connector is mounted for pivotal movement about a vertical axis. A supporting structure provides a number of pivot points for the connector member so that a broad range of changes in the cable running angle can be accommodated by the same device by changing the pivot location of the connector member yet the forces applied to the pole through the pivot points for the connectors by the guys and electric cables pass through the center axis of the pole.

BACKGROUND OF THE INVENTION

Field of the invention

This invention relates to attachment devices and more particularly to such devices suitable for holding the ends of electrical conductors and guys at the upper ends of utility poles.

Description of the prior art

It is common practice to transmit electrical energy along electrical conductor cables which are supported above the ground by vertically extending utility poles. The poles are located along the power transmission right-of-way at intervals as necessary to provide adequate support for the conductor cables. When the direction of the conductor cable is changed and periodically as the length of the cable becomes significant, a dead-end connection with a supporting pole is made. This means that the one end of the cable is fastened to one of the dead-end connections and the other end of the cable is fastened to the other dead-end connection. Several supporting poles may be placed along the length of the cable between the dead-end supporting poles. The electrical energy by-passes the actual dead-end connection by means of a jumper cable attached near the ends of abutting lengths of the cables to span the dead-end connection. When the running angle of the cable changes at a dead-end connection, guys are used to counteract the tension forces applied by the cables to the end of the utility pole. For best results two guys are used when the cable direction is changed, one continuing along the line of one direction of the cable and the other continuing along the line of the other direction of the cable beyond the point where the cables make their dead-end connection with the pole.

When utility poles having a circular cross section are used there is little difficulty involved in providing a suitable connector device which on one side will provide support for the dead-ended electrical conductor and at the other and opposite side will provide a connector for a supporting guy. The proper angular relationship is easily established since the ring can be rotated about the center axis of the pole and all of the forces applied to the pole by the electrical cable and guy wire will pass through the center axis of the pole.

In recent years substantial improvement in the strength of wooden utility poles has resulted from the utilization of rectangular cross sectioned wooden poles and particularly the use of laminated poles having a rectangular cross section. Previous to this invention, a variety of connector devices were used for attachment to the rectangular cross section poles because each range of change in running angle for the cable required a different location of the connector members on the device so that the forces applied to the pole would not cause a twisting force but would pass generally through the center axis of the rectangular pole. For example, one company supplying this type of rectangular cross section dead-end connection utility poles has found a need for not only having five different sizes of attachment devices, but also a need for reducing the cross sectional size of the portion of the pole where the device is to be attached to cover the range of changes in the cable running angle from 5° to 75°. This has meant that a large inventory of different sizes of attachment devices must be carried during pole installation along with a large number of different cross sectioned poles to take care of the different sized devices.

It is therefore seen that there is a need for a universal device suitable for providing dead-end connections for electrical cables supported by rectangular cross section utility poles and suitable for use within a broad range of cable running angle changes.

OBJECTS AND SUMMARY OF THE INVENTION

In view of the need for a universal dead-end connection device for use with rectangular cross section utility poles it is a principal object of the instant invention to provide such a device.

Another object of the instant invention is to provide a dead-end cable connection structure which is made of easily fabricated components and which can be easily installed with a minimum amount of supervision.

A still further object of the instant invention is to provide a generally improved dead-end cable attachment device which includes a provision for changing the location of the connector members to accommodate for a broad range of running angles.

According to the invention, support members are attached to opposite parallel surfaces of a rectangular cross sectioned utility pole. The support members provide a number of pivot points for pivotally supporting on vertically extending pivots a plurality of connector members. Depending upon the running angle involved, the connector members are located in the appropriate pivot supports provided by the support members. The pivot points are located so that a vertical plane passing through a pivot axis on one side of the pole and the center axis of the pole also passes through a pivot axis of a pivot point on the other side of the pole.

These and other features and advantages of the invention will become more clearly apparent from the following detailed description thereof, which is to be read with reference to the accompanying drawings.

BRIEF DESCRIPTION OF THE DRAWINGS

In the drawings:

FIG. 1 is an isometric view showing the generally improved device of the instant invention as it is installed at the upper end of a rectangular cross sectioned utility pole;

FIG. 2 is a top plan view of the improved device as shown in FIG. 1; and

FIG. 3 is a top plan view of a typical dead-end angle connection illustrating a typical installation utilizing the improved device made in accordance with the invention.

DESCRIPTION OF THE PREFERRED EMBODIMENT

With general reference to FIG. 3 a typical dead-end angle connection installation is shown utilizing the universal guy attachment 1 made in accordance with the instant invention. As shown the universal attachment 1 is installed at the upper end of a utility pole 3 which is used to support the dead-end connections of the electric energy conductor cables 5 and 6, by means of universal attachment device 1 at dead-end connections 8 and 9. A jumper cable 10 is used to conduct the electrical energy from power conductor cable 5 to power conductor cable 6. The axis of the initial cable direction of conductor cable 6 is identified generally at 12. The change in direction between the axis 12 and the direction of the other power conductor cable 5 is generally termed as the running angle identified at 13.

To counteract the tension forces applied to pole 3 by the power conductor cables 5 and 6, guys 35 and 36 are anchored into the ground with guy anchors 39 and 40 and extend up to and are connected to universal guy attachment 1. It should be noted that guy wire 35 extends away from pole 3 in the same direction along axis 12 that power conductor cable 6 extends to counterbalance the tension applied to pole 3 by cable 6. In a similar manner guy wire 36 extends away from pole 3 along the same direction as does power conductor cable 5 so that the tension applied to pole 3 by conductor cable 5 is counteracted by the tension applied to pole 3 by guy wire 36.

The actual connection between pole 3 and cables 5 and 6 and guy wires 35 and 36 is made through universal guy attachment 1. As best shown in FIGS. 1 and 2, attachment 1 includes upper support angles 20 and 21 which are firmly held against opposite parallel side surfaces of pole 3 by means of bolts 31 and are vertically spaced from lower support angles 22 and 23 which are similarly firmly supported on pole 3 by means of bolts 31. Support angles 20 to 23 include vertical extending sections which extend along and parallel to the side surfaces of pole 3 and are kept from digging into the surface of pole 3 by means of back-up guide plates 29 which are positioned flat against surfaces of the pole 3 for distributing the forces applied through support angles 20 to 23. In the horizontal portions of support angles 20 to 23 there are provided a series of pivot points or apertures 25 and 26 which are aligned between upper support angles 20 and 21 and lower support angles 22 and 23 to provide vertical pivot axes for connector members 15 through 18. Connector members 15 through 18 are pivotally attached between support angles 20 to 23 by means of pivot pins 33 and 34 which extend into pivot apertures 25 and 26 of the support angles 20 to 23, and then through the body of the connector plates 15 to 18. In this manner the connector plates 15 to 18 are permitted to pivot about vertically extending pivot pins 33 and 34.

Depending upon the running angle involved, connectors 15 to 18 are selectively located along the pivot points 25 and 26 so that the forces applied through the connector plates 15 to 18 to support members 20 to 23 pass generally through the center axis 4 of utility pole 3.

As shown in FIG. 2 a number of pivot apertures 25, 26 are provided in attachment device 1. The apertures 25 provided in supports 21, 23 are aligned with apertures 26 provided in supports 20, 22 so that vertical planes $a-a'$ to $g-g'$ passing through the axes of apertures 25 and center axis 4 of pole 3 also pass through the axes of apertures 26. The connector members are selectively positioned in apertures 25 and 26 to accommodate particular running angle changes. For example and as shown connector 15 is positioned to pivot about vertical axis 41 to support cable 5 for running angle 13 changes in the range between 5° to 45° while connector 18 is positioned to pivot about vertical axis 42 to support guy 36. Since axes 41, 42 and pole axis 4 each lie along vertical plane $e-e'$ the tension forces applied to pole 3 are balanced with little twisting thereof. A similar result is obtained by the positioning of connector 17, fastened to the end of guy 35, to pivot about vertical axes 43 and the positioning of connector 16, fastened to the end of cable 6, to pivot about vertical axis 44 with vertical plane $c-c'$ passing through axes 43, 44 and 4.

For running angles within the range of 0° to 5° the connectors are positioned to pivot about axes located on vertical planes $d-d'$. For running angles with the range of 45° to 65°, the connectors are positioned to pivot about axes located on vertical planes $b-b'$ and $f-f'$. Further, for running angles within the range of 65° to 75°, the connectors are positioned to pivot about axes located on vertical planes $a-a'$ and $g-g'$.

What is claimed is:

1. A device comprising:
   support means including first and second support members having parallel surfaces spaced from one another;
   said support members providing a plurality of pivot points which establish pivot axes;
   connector means selectively positioned at said pivot axes in a force transmitting relationship with said support members;
   said selective positioning of said connector means being established when a first plane passes through the pivot axis of a first connector means positioned in said first support member, through a common point positioned halfway between said first and second support members and then through the pivot axis of a second connector means positioned in said second support member, and a second plane passes through the pivot axis of a third connector means positioned in said first support member, through said common point, and then through the pivot axis of a fourth connector means positioned in said second support member.

2. The device of claim 1 wherein:
   said support means include angle members having vertical and horizontal portions with said horizontal portions providing apertures for establishing said pivot axes.

3. The device of claim 2 wherein:
   said connector means includes pin members for extending into said apertures.

4. The device of claim 2 wherein:
   a pair of said angle members are spaced apart vertically with said apertures of the upper member of said pair vertically aligned with said apertures of the lower member of said pair.

5. A utility connection comprising:
   a utility pole, electrical power cable means, guy wire means, and an attachment device in combination;
   said pole having first and second parallel side surfaces;
   said attachment device including first support means firmly attached to said first side surface and second support means firmly attached to said second side surface;
   said first support means including first connector means pivotally mounted for pivoting about a first vertical axis and firmly attached to the end of a first of said power cable means;
   said second support means including second connector means pivotally mounted for pivoting about a second vertical axis and firmly attached to the end of a second of said guy wire means;
   said first and second vertical axes positioned so that a first vertical plane passing through said first and second vertical axes also passes through the center axis of said pole.

6. The utility connection of claim 5 wherein:
   said first support means also includes third connector means pivotally mounted for pivoting about a third vertical axis and firmly attached to the end of a first of said guy wire means;

said second support means also including fourth connector means pivotally mounted for pivoting about a fourth vertical axis and firmly attached to the end of a second of said power cable means;

said third and fourth vertical axes positioned so that a second vertical plane passing through said third and fourth vertical axes also passes through the center axis of said pole.

References Cited

UNITED STATES PATENTS

| 733,755 | 7/1903 | Schickluna | 174—45 |
| 1,330,808 | 2/1920 | James | 52—150 |

FOREIGN PATENTS

| 182,205 | 7/1966 | U.S.S.R. |

LARAMIE E. ASKIN, Primary Examiner

U.S. Cl. X.R.

52—152; 174—45

PO-1050
(5/69)

UNITED STATES PATENT OFFICE
CERTIFICATE OF CORRECTION

Patent No.     3,538,237        Dated    November 3, 1970

Inventor(s)     EDMUND E. HOCKADAY

It is certified that error appears in the above-identified patent and that said Letters Patent are hereby corrected as shown below:

In column 1, line 4, "Hockaway" should read --Hockaday-- and in column 4, line 11, "with" should read --within--.

Signed and sealed this 23rd day of March 1971.

(SEAL)
Attest:

EDWARD M. FLETCHER, JR.             WILLIAM E. SCHUYLER, JR.
Attesting Officer                   Commissioner of Patents